US006888947B2

(12) United States Patent
Takeshima et al.

(10) Patent No.: US 6,888,947 B2
(45) Date of Patent: May 3, 2005

(54) PIEZOELECTRIC ELECTROACOUSTIC TRANSDUCER

(75) Inventors: Tetsuo Takeshima, Toyama (JP); Masakazu Yamauchi, Toyama-ken (JP); Manabu Sumita, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/795,506

(22) Filed: Mar. 9, 2004

(65) Prior Publication Data

US 2004/0205949 A1 Oct. 21, 2004

(30) Foreign Application Priority Data

Apr. 21, 2003 (JP) ...................................... 2003-115857

(51) Int. Cl.[7] ........................ H04R 25/00; H04L 41/053

(52) U.S. Cl. ........................ 381/190; 310/348; 381/398; 381/191; 381/431; 381/423

(58) Field of Search ................................ 381/114, 173, 381/190, 191, 398, 426, 386, 394, 395, 423, 152, 431; 181/164, 167, 170, 174; 310/344, 324, 332, 345, 348, 359, 311, 322, 325; 367/155, 157, 170, 180

(56) References Cited

U.S. PATENT DOCUMENTS 4,684,843 A * 8/1987 Ohya et al. ................. 310/355
5,701,048 A * 12/1997 Kaida ......................... 310/321
6,111,338 A * 8/2000 Otsuchi et al. ............. 310/352
6,420,818 B1 * 7/2002 Kishimoto et al. ......... 310/324
6,420,945 B1 * 7/2002 Yamamoto et al. ......... 333/189
6,427,017 B1 * 7/2002 Toki ........................... 381/190
6,445,254 B1 * 9/2002 Shibuya et al. ............... 331/68
6,531,806 B1 * 3/2003 Daidai ........................ 310/344
6,563,400 B2 * 5/2003 Itasaka et al. .............. 333/187
6,570,299 B2 * 5/2003 Takeshima et al. ......... 310/348
6,587,567 B1 * 7/2003 Yamamoto .................. 381/190
6,594,369 B1 * 7/2003 Une ........................... 381/174
6,653,762 B2 * 11/2003 Takeshima .................. 310/340
6,720,713 B2 * 4/2004 Yamazaki et al. .......... 310/345
6,741,710 B1 * 5/2004 Takeshima et al. ......... 381/190
6,744,180 B2 * 6/2004 Nakamura et al. .......... 310/348
2001/0004180 A1 * 6/2001 Kishimoto .................. 310/324
2001/0045792 A1 * 11/2001 Takeshima .................. 310/340

FOREIGN PATENT DOCUMENTS

| | | |
|---|---|---|
| JP | 61-161100 | 7/1986 |
| JP | 2002-010393 | 1/2002 |

* cited by examiner

*Primary Examiner*—Huyen Le
*Assistant Examiner*—Dionne Harvey
(74) *Attorney, Agent, or Firm*—Keating & Bennett, LLP

(57) ABSTRACT

A piezoelectric electroacoustic transducer includes a substantially rectangular piezoelectric diaphragm having an internal electrode, a plurality of laminated piezoelectric ceramic layers having the internal electrode interposed between two of the piezoelectric ceramic layers, principal-surface electrodes disposed on top and bottom principal surfaces of the piezoelectric diaphragm, the piezoelectric diaphragm generating surface bending-vibrations in response to application of an alternating signal between the principal-surface electrodes and the internal electrode, a resin film that is larger than the piezoelectric diaphragm and having the piezoelectric diaphragm affixed onto substantially a central portion of a front surface thereof, and a housing having a support for supporting the outer periphery of the resin film. The resin film has heat resistance at least a reflow-soldering temperature and at least one undulated portion bending in the front and rear directions thereof and formed in the outer periphery thereof, and the perimeter of the resin film including the four corners thereof is fixed to the support of the housing by adhesion.

19 Claims, 17 Drawing Sheets

RELATIONSHIPS BETWEEN MODULI OF ELASTICITY OF ADDED WEIGHT AND FREQUENCY VARIANCES OF SECONDARY RESONANT FREQUENCY BY AREA RATIO OF ADDED WEIGHT

PIEZOELECTRIC ELECTROACOUSTIC TRANSDUCER

BACKGROUND OF THE INVENTION

1. Field of the Invention

The present invention relates to piezoelectric electroacoustic transducers such as a piezoelectric receiver, a piezoelectric sounder, and a piezoelectric loudspeaker, and more particularly, the present invention relates to a surface-mountable electroacoustic transducer.

2. Description of the Related Art

Conventional electroacoustic transducers have been widely used in electronic apparatuses, household electrical appliances, portable phones, and so forth, to provide a piezoelectric sounder or a piezoelectric receiver generating an audible alarm or an operating sound.

The known electroacoustic transducer has a general structure in which a unimorph piezoelectric diaphragm is formed by affixing a piezoelectric plate onto one surface of a metal plate, the perimeter of the metal plate is fixed inside a casing by adhesion, and the opening of the casing is covered with a cover.

However, since such a diaphragm generates bending vibrations by restraining the piezoelectric plate generating square-type vibrations with the metal plate having an area that does not vary, the diaphragm has a low acoustic conversion efficiency and also has difficulties in having a compact structure and a sound characteristic having a low resonant frequency. In addition, the periphery of the diaphragm is restrained by the casing, causing a problem of a higher resonant frequency.

Japanese Unexamined Patent Application Publication No. 61-161100 has proposed a piezoelectric loudspeaker having a structure in which a round unimorph piezoelectric diaphragm is affixed onto the central portion of a round synthetic resin film. The film has a flat portion formed at the central portion thereof and has a circular projection formed around the flat portion by molding.

This proposed electroacoustic transducer has an advantage that a broader frequency characteristic than that of the above-described electroacoustic transducer formed by directly bonding the diaphragm to the casing is obtained due to the elasticity of the film and the projection.

However, because of a unimorph piezoelectric diaphragm, the diaphragm has difficulties in achieving high acoustic conversion efficiency and a compact structure. Also, since the diaphragm and the film are both round, their deformed volumes are small, thereby resulting in an unsatisfactory acoustic conversion efficiency.

Japanese Unexamined Patent Application Publication No. 2002-10393 has proposed a piezoelectric diaphragm having a high acoustic conversion efficiency. This piezoelectric diaphragm has a structure in which a laminate is formed by laminating two or three rectangular piezoelectric ceramic layers, having an internal electrode interposed between two of them, and has principal-surface electrodes formed on the front and rear principal surfaces thereof. The ceramic layers are polarized in the same thickness direction thereof, and, by applying an alternating signal between the principal-surface electrodes and the internal electrode, the laminate generates bending vibrations so as to generate a sound.

The piezoelectric diaphragm having the above-described structure is a ceramic laminate, and the two vibrating regions (ceramic layers) disposed one by one in the thickness direction vibrate in the opposite direction relative to each other, thereby achieving a greater deformation, that is, a higher sound pressure, than that achieved by a unimorph piezoelectric diaphragm in which a piezoelectric plate is affixed onto a metal plate. Also, this piezoelectric diaphragm is rectangular, thereby achieving a greater deformed volume and thus a higher sound pressure than those achieved by a round diaphragm.

Although the piezoelectric diaphragm has an excellent acoustic conversion efficiency as described above, this diaphragm has a problem of a high resonant frequency caused by its structure in which, when it is supported by a casing or the like, its surrounding area must be sealed by adhesion without leaving a space therein. For example, when two mutually opposed sides of the piezoelectric diaphragm having dimensions of 10 mm×10 mm are fixed onto to the casing by adhesion, and the other two sides are elastically sealed so as to be deformable, its resonant frequency lies at about 1200 Hz, thereby resulting in a significantly lowered sound pressure at about 300 Hz which is the lower limit of the human voice band.

A piezoelectric receiver requires an electroacoustic transducer that has an almost flat sound-pressure characteristic in a frequency band from 300 Hz to 3.4 kHz, which is equivalent to the human voice band, and that is capable of playing back a broadband voice. Unfortunately, the above-mentioned supporting structure does not permit the transducer to have an almost flat sound-pressure characteristic in a broad band. Although the larger casing and diaphragm lead to a lower resonant frequency, this results in a larger size of the electroacoustic transducer.

To solve the above-described problem, when the piezoelectric diaphragm generating surface bending-vibrations has a resin film that is larger than the piezoelectric diaphragm, affixed onto one surface thereof, and the outer periphery of the film is bonded to a support of a housing, the piezoelectric diaphragm can be supported without being strongly restrained. In this case, the piezoelectric diaphragm is more likely to vibrate than in the conventional case where two or four sides of the piezoelectric diaphragm are supported by the housing. As a result, even when the diaphragm has the same dimensions as those of the conventional one, its resonant frequency can be made lower, and also its deformation can be made greater because of a lowered support-constraining force exerted thereon, thereby achieving a high sound pressure. In addition, the obtained sound pressure does not drop in a frequency region from the fundamental resonant frequency to the secondary resonant frequency, thereby playing back of a broadband voice.

On the contrary, in the electroacoustic transducer having the above-mentioned resin film used therein, a stress exerted on the film varies in accordance with the bonding states between the film and the housing, thereby causing the diaphragm to have a shifted resonant frequency and accordingly a fluctuated frequency characteristic.

Although the electroacoustic transducer is also expected to be surface-mountable so as to be directly mounted on a circuit board, the film, the housing, an adhesive, and the like are deformed due to heat during reflow soldering, thereby causing a stress exerted on the piezoelectric diaphragm to vary and thus its frequency characteristic to vary before and after reflow soldering.

SUMMARY OF THE INVENTION

In order to overcome the problems described above, preferred embodiments of the present invention provide a piezoelectric electroacoustic transducer which prevents fluctuation or variation of a frequency characteristic in accordance with the bonding states between a film and a housing or due to heat during reflow soldering.

According to a preferred embodiment of the present invention, a piezoelectric electroacoustic transducer includes a substantially rectangular piezoelectric diaphragm having an internal electrode, a plurality of laminated piezoelectric ceramic layers having the internal electrode interposed between two of the piezoelectric ceramic layers, principal-surface electrodes disposed on top and bottom principal surfaces of the piezoelectric diaphragm, the piezoelectric diaphragm generating surface bending-vibrations in response to application of an alternating signal between the principal-surface electrodes and the internal electrode, a substantially rectangular resin film that is larger than the piezoelectric diaphragm and having the piezoelectric diaphragm affixed onto substantially a central portion of the front surface thereof, and a housing having the piezoelectric diaphragm and the resin film housed therein and having a support for supporting the outer periphery of the resin film on which the piezoelectric diaphragm is not affixed. The resin film is heat resistant to at least a reflow-soldering temperature, the perimeter of the resin film including the four corners thereof is fixed to the support of the housing by adhesion, the area of the piezoelectric diaphragm is about 40% to about 70% of the area of a portion of the resin film which is not fixed to the support by adhesion, and the resin film has at least one undulated portion bending in the front and rear directions thereof and formed in the outer periphery thereof on which the piezoelectric diaphragm is not affixed and inside the perimeter thereof which is fixed to the support by adhesion.

In the piezoelectric electroacoustic transducer according to a preferred embodiment of the present invention, the piezoelectric diaphragm generating surface bending-vibrations has the substantially rectangular resin film that is larger than the piezoelectric diaphragm, affixed onto one surface thereof. By bonding the circumference of the film to the support of the housing, the piezoelectric diaphragm can be supported without being strongly restrained, and thus the piezoelectric diaphragm is more likely to vibrate than in the conventional case where the piezoelectric diaphragm is directly bonded to the housing. As a result, even when the diaphragm has the same dimensions as those of the conventional one, its resonant frequency can be lower, and also its deformation can be greater because of a lowered support-restraining force exerted thereon, thereby achieving a high sound pressure. In addition, the obtained sound pressure does not drop in a frequency region from the fundamental resonant frequency to the secondary resonant frequency, thereby playing back a broadband voice.

The size ratio (area ratio) of the piezoelectric diaphragm to the resin film is relevant to a sound pressure characteristic. When the area ratio of the piezoelectric diaphragm to the resin film is in a range from about 40% to about 70%, the sound pressure characteristic is satisfactory, and, when the area ratio is smaller than about 40% or greater than about 70%, the sound pressure tends to decrease. With this in mind, in preferred embodiments of the present invention, the area ratio of the piezoelectric diaphragm to the resin film is preferably in a range from about 40% to about 70%.

The resin film has at least one undulated portion bending in the front and rear directions thereof and located in the outer periphery thereof on which the piezoelectric diaphragm is not affixed and inside the perimeter thereof, which is fixed to the support by adhesion. In other words, the undulated portion is formed so as to correspond to at least the bonding portions between the resin film and the support of the housing. With this structure, even when a stress exerted on the film varies in accordance with the bonding states between the film and the housing, a variance in the stress is absorbed due to elasticity of the undulated portion, thereby allowing the diaphragm to have a constant resonant frequency and accordingly a stable frequency characteristic.

Likewise, although thermal stresses are exerted on the film, the housing, the adhesive, and so forth due to heat generated during reflow soldering, these stresses are absorbed due to the elasticity of the undulated portion of the film so as to stabilize a stress exerted on the piezoelectric diaphragm, thereby preventing the piezoelectric diaphragm from having a shifted resonant frequency and a varied frequency characteristic.

The film, the housing, the piezoelectric diaphragm, the adhesive, and so forth are preferably composed of materials which are heat resistant to at least a temperature of reflow soldering (for example, about 220° C. to about 260° C.).

In the piezoelectric electroacoustic transducer, the undulated portion is preferably located along the circumference of the resin film.

When the undulated portion is located along the circumference of the resin film, the undulated portion can absorb a stress exerted on the film in any direction, thereby minimizing a variance in the frequency characteristic of the diaphragm.

In particular, when the circumference of the resin film is fixed to the support of the housing by adhesion, it is preferable that the undulated portion be located along the circumference of the resin film.

The piezoelectric electroacoustic transducer may have a structure in which the undulated portion is located along each side of the resin film except for the central portion of the side, and electrically conductive adhesives applied on the central portions of the sides of the resin film where the corresponding undulated portions are not formed connect electrodes of the piezoelectric diaphragm with corresponding terminals disposed in the housing.

The electrically conductive adhesives are sometimes used for electrically connecting the electrodes of the piezoelectric diaphragm and the corresponding terminals disposed in the housing with each other. In this case, when the electrically conductive adhesive spreads to the corresponding undulated portion, the undulated portion has a decreased stress-absorbing effect, thus causing fluctuation of the frequency characteristic.

In order to prevent the above-described problem, by forming the undulated portion along each side of the resin film except for the central portion of the side and by applying the electrically conductive adhesive along a void of the side where the undulated portion is absent, the electrodes of the piezoelectric diaphragm and the corresponding terminals are electrically connected with each other while maintaining the stress-absorbing effect of the undulated portions.

In the piezoelectric electroacoustic transducer, a weighting member preferably composed of a visco-elastic material is preferably added onto the piezoelectric diaphragm.

When the piezoelectric electroacoustic transducer has a structure in which the laminated piezoelectric diaphragm is affixed onto the resin film, since its sound pressure drops in a frequency range between the fundamental resonant frequency and the secondary resonant frequency, its sound pressure characteristic cannot be made flat. In order to make the sound pressure characteristic flat, only the secondary resonant frequency should be made lower without causing the fundamental resonant frequency to vary.

Thus, when a weighting member composed of a visco-elastic material is added onto the piezoelectric diaphragm, only the secondary resonant frequency can be made lower without causing the fundamental resonant frequency to vary, thereby achieving a flat sound-pressure characteristic. In the meantime, since the frequency characteristic deteriorates when the weighting member extends over the resin film, the weighting member must be added not to extend outside the piezoelectric diaphragm.

The sound-pressure frequency characteristic can be adjusted in accordance with an added amount of the weight of the weighting member. Since the secondary resonant frequency is unlikely to be made lower when the weighting member has an excessively high Young's modulus, the weighting member is preferably composed of a visco-elastic material such as a silicon rubber. To be specific, in the piezoelectric electroacoustic transducer, the Young's modulus of the weighting member is preferably not greater than about 10 MPa.

In the piezoelectric electroacoustic transducer, the ratio of the mass of the weight to the total mass of the piezoelectric diaphragm including the resin film is preferably not greater than about 0.4.

Although the sound pressure drops in a frequency region lower than the secondary resonant frequency, as the added mass ratio becomes greater, the secondary resonant frequency becomes lower, and a drop in the sound pressure becomes smaller, thus the sound pressure characteristic in the above frequency region becomes flatter. In the meantime, when the added mass ratio becomes excessively greater, the sound pressure in a frequency region lower than the fundamental resonant frequency decreases.

When the mass ratio is not greater than about 0.4, a drop in the sound pressure in the above frequency region can be decreased, and, at the same time, a decrease in the frequency range lower than the fundamental resonant frequency can be prevented.

In the piezoelectric electroacoustic transducer, the Young's modulus of the weighting member is preferably not greater than about 10 MPa.

The weighting member is desirably composed of a low elastic material in order to make the secondary resonant frequency lower. When the Young's modulus of the weighting member exceeds about 10 MPa, the secondary resonant frequency is unlikely to be made lower, whereby it is preferable that the Young's modulus of the weighting member be not greater than about 10 MPa so as to effectively make the secondary resonant frequency lower.

Other features, elements, characteristics and advantages of the present invention will become more apparent from the following detailed description of preferred embodiments thereof with reference to the attached drawings.

DETAILED DESCRIPTION OF PREFERRED EMBODIMENTS

FIGS. 1 to 7 illustrate a surface-mountable piezoelectric electroacoustic transducer according to a first preferred embodiment of the present invention.

The electroacoustic transducer according to the present preferred embodiment is capable of playing back a broad-band voice having an almost flat sound-pressure characteristic in the human voice band (about 300 Hz to about 3.4 kHz) like a piezoelectric receiver and includes a laminated piezoelectric diaphragm 1, a resin film 10, a casing 20, and a cover 30. The casing 20 and the cover 30 define a housing.

Figure 6:
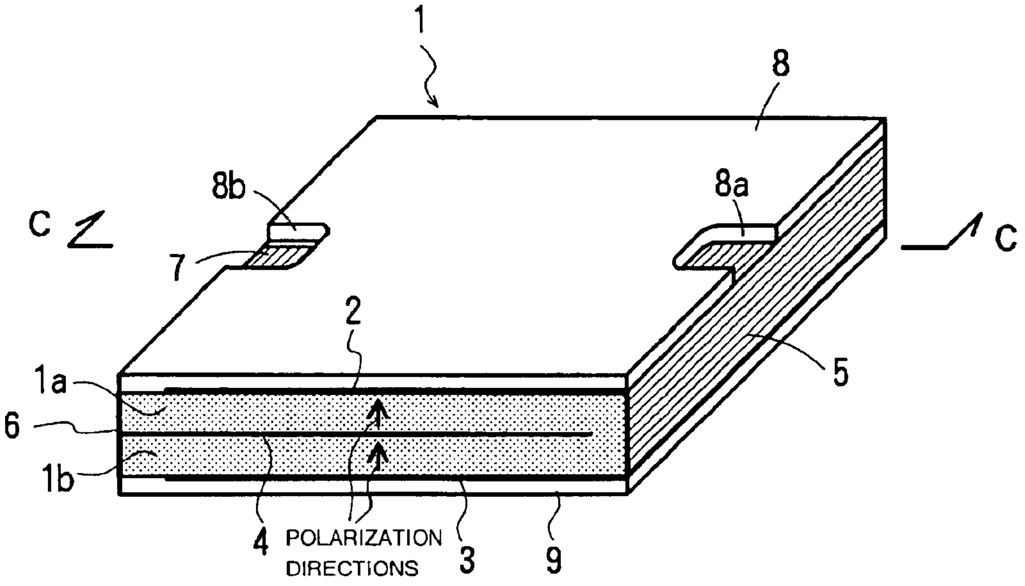
FIG. 6 is a magnified perspective view of the piezoelectric diaphragm.
Figure 7:
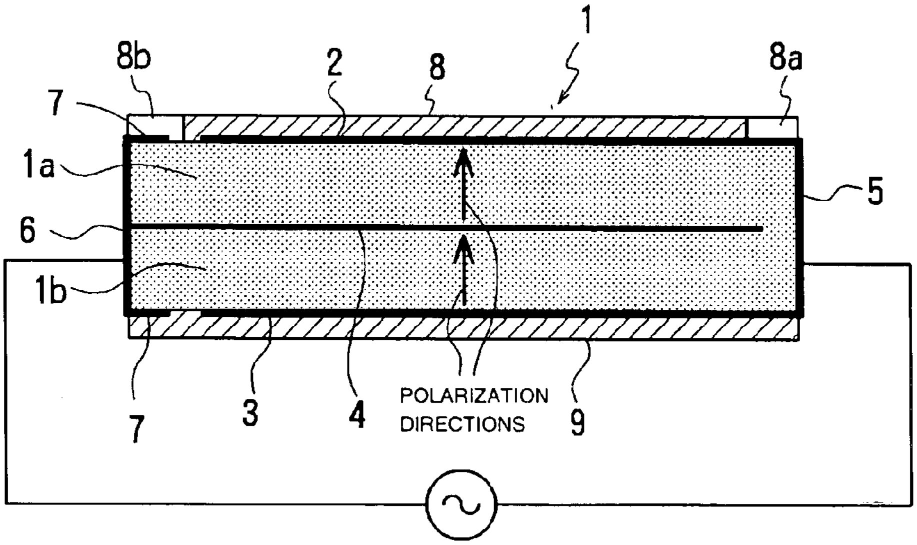
FIG. 7 is a sectional view of the piezoelectric diaphragm taken along the line C—C indicated in FIG. 6.

As shown in FIGS. 6 and 7, the diaphragm 1 is preferably formed by laminating two ceramic layers 1*a* and 1*b* and has principal-surface electrodes 2 and 3 formed on top and bottom principal surfaces thereof, and the ceramic layers 1*a* and 1*b* have an internal electrode 4 interposed therebetween. The two ceramic layers 1*a* and 1*b* are polarized in the same thickness direction as shown by the bold arrows indicated in the figures. Each of the principal-surface electrodes 2 and 3, which is respectively close to the top and bottom surfaces, is arranged so as to be somewhat shorter than the length of one side of the diaphragm 1, and one end thereof is connected to an end-surface electrode 5 disposed on one end surface of the diaphragm 1. Hence, the principal-surface electrodes 2 and 3 on the top and bottom surfaces are connected to each other. The internal electrode 4 is preferably substantially symmetrical with the principal-surface electrodes 2 and 3 and has one end lying away from the end-surface electrode 5 and the other end connected to an end-surface electrode 6 disposed on the other end surface of the diaphragm 1. The diaphragm 1 also has auxiliary electrodes 7 disposed on the top and bottom surfaces of the other end portion thereof and connected to the end-surface electrode 6. The auxiliary electrodes 7 may be belt-shaped electrodes having a constant width or partial electrodes disposed so as to correspond to only a cut **8*b*** and another cut (not shown), which will be described later.

In this preferred embodiment, the ceramic layers **1*a* and 1*b*** are preferably composed of a lead-zirconate-titanate (PZT) ceramic having a substantially square shape with a side length of about 7 mm to about 8 mm and a thickness of about 15 μm per layer (about 30 μm in total), for example.

The diaphragm 1 has resin layers 8 and 9 disposed on the top and bottom surfaces thereof so as to cover the principal-surface electrodes 2 and 3. The resin layers 8 and 9 are arranged so as to define protecting layers for preventing the diaphragm 1 from being cracked due to a dropping impact and are selectively used as needed. The resin layer 8 on the front surface has a cut **8*a* and the cut 8*b* formed at the central portions of two mutually opposed sides thereof, to which the principal-surface electrode 2 and the one auxiliary electrode 7 are exposed, respectively. Also, the resin layer 9 on the rear surface has the other cut (not shown) formed so as to face the cut 8*b*, to which the other auxiliary electrode 7** is exposed.

The resin layers 8 and 9 of this preferred embodiment are preferably composed of a polyamide-imide resin having a thickness of about 5 μm to about 10 μm.

The diaphragm 1 is bonded with an adhesive 11, to substantially the central portion of the front surface of the substantially rectangular resin film 10 that is larger than the diaphragm 1. The adhesive 11 is, for example, an epoxy adhesive.

The resin film 10 is preferably thinner than the piezoelectric diaphragm 1 and is preferably composed of resin material with a Young's modulus in a range from about 500 MPa to about 15,000 MPa. The resin film 10 desirably is heat resistant to at least a reflow-soldering temperature (for example, about 300° C.). To be specific, the resin film 10 is preferably composed of, for example, an epoxy, acrylic, polyimide, or polyamide-imide resin material.

The resin film 10 used in this preferred embodiment is preferably formed of a substantially square polyimide film with a side of about 10 mm, a thickness of about 7.5 μm, and a Young's modulus of about 3400 MPa, for example.

The size ratio (area ratio) of the piezoelectric diaphragm 1 to the resin film 10 is relevant to a sound pressure characteristic. The inventors have discovered that, when the area ratio of the piezoelectric diaphragm 1 to the resin film 10 is in a range from about 40% to about 70%, the sound pressure characteristic is most satisfactory, and, when the area ratio is smaller than about 40% or greater than about 70%, the sound pressure tends to decrease. With this in mind, it is preferable that the area ratio of the piezoelectric diaphragm 1 to the resin film 10 is within a range from about 40% to about 70%.

Figure 8:
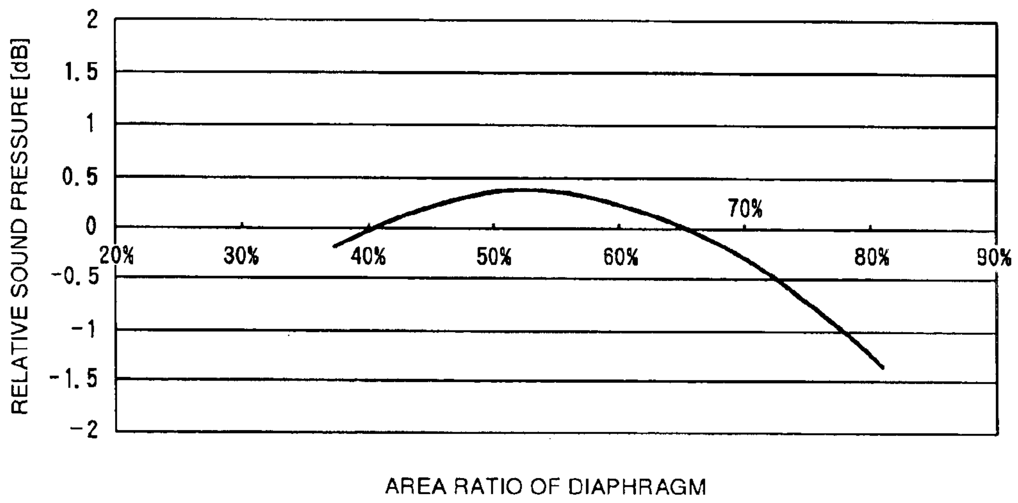
FIG. 8 is a graph illustrating the relationship between area ratio of the diaphragm and relative sound pressure.

FIG. 8 illustrates the relationship between area ratio of the piezoelectric diaphragm 1 affixed onto the substantially square resin film 10 with a side of about 10 mm and relative sound pressure (dB) of the same. A relative sound pressure is defined as a sound-pressure converted value which is set 0 dB when the piezoelectric diaphragm 1 is subjected to a deformed volume of approximately $1\times10^{-6}$ $m^3$ at 100 Hz.

As is obvious from the figure, when the area ratio of the piezoelectric diaphragm 1 is in a range from about 40% to about 70%, the relative sound pressure is substantially greater than 0 dB, and the sound pressure characteristic is thus satisfactory. On the other hand, when the area ratio is smaller than about 40% or greater than about 70%, the relative sound pressure tends to decrease more sharply. Since the largest deformation of the piezoelectric diaphragm 1 at 100 Hz is obtained when its area ratio is about 55%, the optimal area ratio of the diaphragm 1 is about 55% from the viewpoint of the sound pressure characteristic.

The resin film 10 has undulated portions 12 formed by molding in the outer peripheral portion thereof extending outward from the diaphragm 1. In this preferred embodiment, each undulated portion 12 is formed along each side of the resin film 10 excluding the central portion thereof, that is, along each of four corners so as to be shaped like a letter L. The undulated portion 12 has a shape bending in the front and rear directions of the resin film 10 and works so as to relieve a stress exerted on the resin film 10 in directions along the surface thereof. Although the undulated portion 12 in this preferred embodiment has an upward protruding shape having a width of about 0.5 mm and a depth of about 0.2 mm, it may have a downward protruding shape or a shape like a corrugated plate bending repetitively upward and downward. In addition, its sectional shape may be curved like a dome. As will be described later, although the resin film 10 is bonded to a support **20*f* of the casing 20 in the vicinities of the four corners thereof, it is preferable that the undulated portions 12** be formed so as to correspond to at least the above-mentioned bonding portions.

When the undulated portions 12 are partially provided as described above, preferably the undulated portions 12 are disposed along at least about 30% of the circumference of the casing 20 in order to provide a stress relieving effect.

The casing 20 is preferably made of an insulating material such as ceramic, resin, or glass epoxy and is formed in the shape of a cubic box having a bottom wall **20*a* and four side walls 20*b* to 20*e*. In the event the casing 20 is composed of resin, a heat resistant resin such as a liquid crystal polymer (LCP), a syndiotactic polystyrene (SPS), a polyphenylene sulfide (PPS), or epoxy is desirable so as to be resistant to reflow soldering. The four side walls 20*b* to 20*e* have the enclosing support 20*f* disposed on the inner periphery thereof so as to support the lower surface of the outer periphery of the resin film 10, and the two mutually opposed side walls 20*b* and 20*d* respectively have inner connectors 21*a* and 22*a* of a pair of terminals 21 and 22, exposed to the vicinity of the support 20*f* extending inside the side walls 20*b* and 20*d*. The terminals 21 and 22 are preferably formed by molding so as to be insertable in the casing 20 and respectively have outer connectors 21*b* and 22*b* protruding outward from the casing 20 and bent toward the bottom of the casing 20 so as to extend along the outer surfaces of the side walls 20*b* and 20*d*. In this preferred embodiment, each of the inner connectors 21*a* and 22*a* of the terminals 21 and 22 is bifurcated so that the bifurcated inner connectors 21*a* and 22*a* extend in the vicinities of the corners of the casing 20**.

Although the support **20*f* is formed along the entire inner periphery of the casing 20 so as to support the entire outer periphery of the resin film 10, the support 20***f* may be partially disposed so as to support only the lower surfaces of the four corners of the resin film 10.

Figure 1:
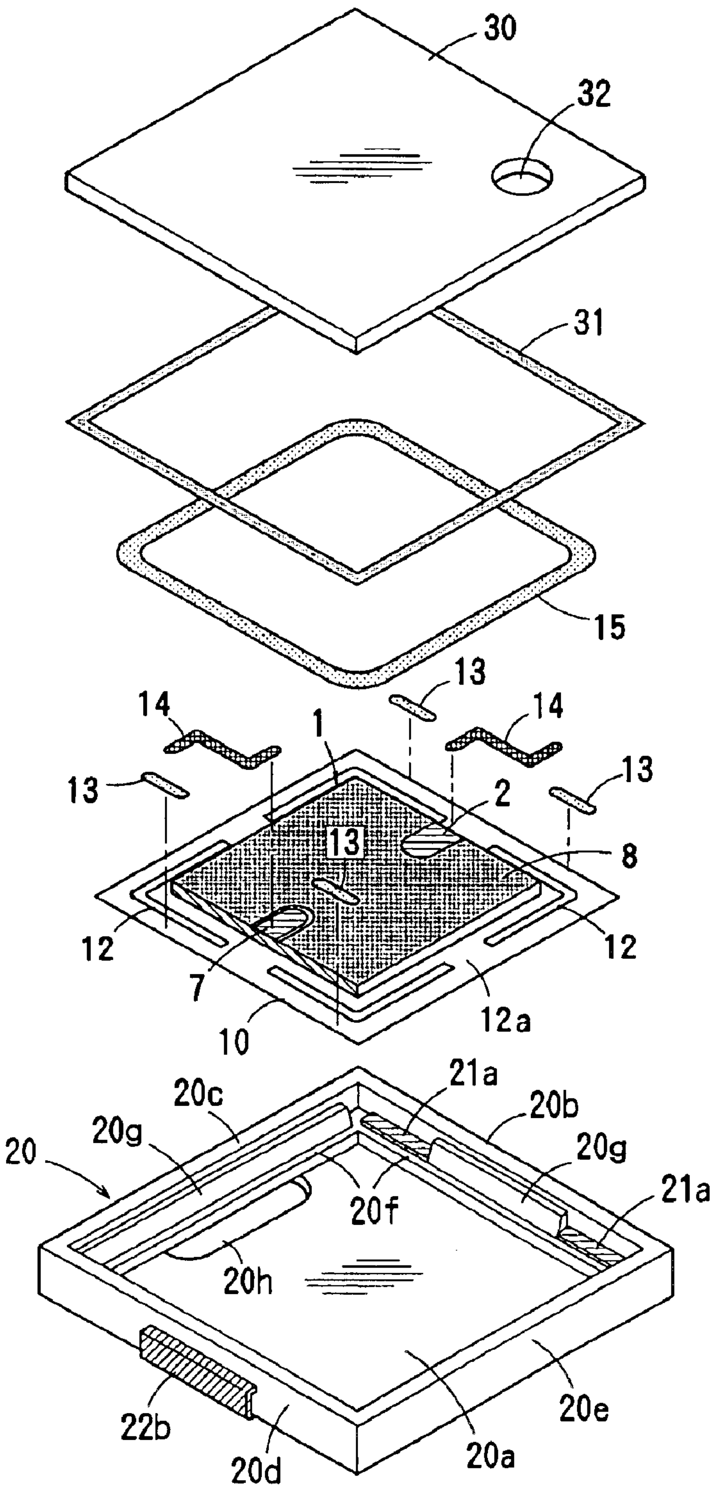
FIG. 1 is an exploded perspective view of an example piezoelectric electroacoustic transducer according to a first preferred embodiment of the present invention.
Figure 2:
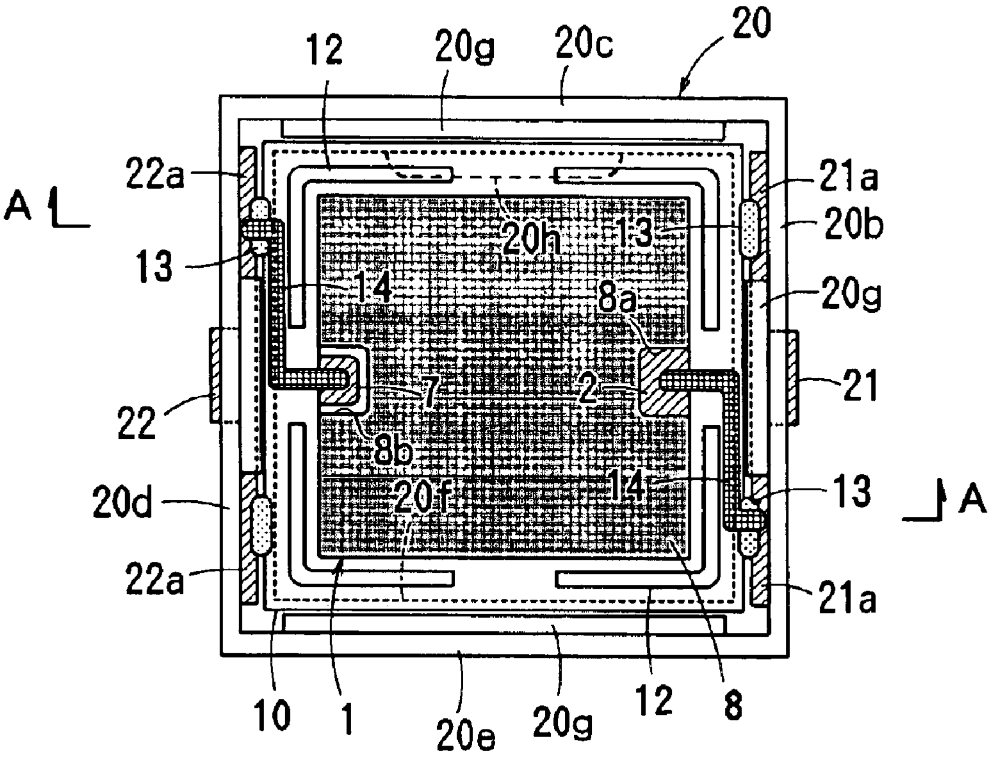
FIG. 2 is a plan view of the piezoelectric electroacoustic transducer shown in FIG. 1, from which a cover and an elastic sealant are removed.
Figure 3:
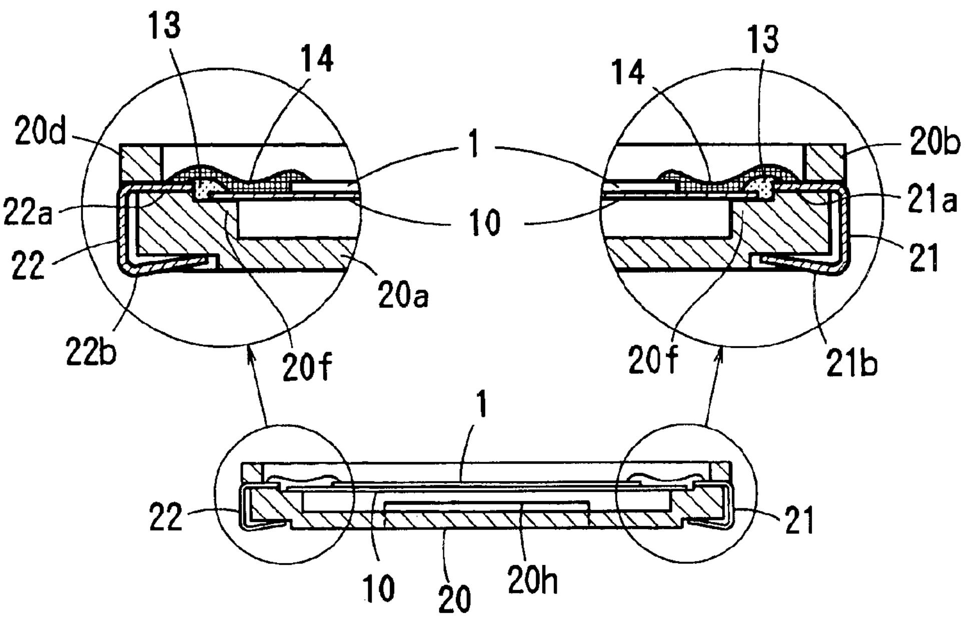
FIG. 3 is a sectional view taken along the line A—A indicated in FIG. 2.

The casing 20 has guides 20*g* disposed outside the support 20*f* and inside the four side walls 20*b* to 20*e* so as to guide the outer periphery of the resin film 10. Each guide 20*g* has a declined surface declining gradually inward and downward and formed on the inside surface thereof so that the resin film 10 is guided along the declined surfaces so as to be accurately placed on the support 20*f*. As shown in FIG. 3, the support 20*f* is formed so as to lie lower by one step than the inner connectors 21*a* and 22*a* of the terminals 21 and 22. With this structure, when the resin film 10 is placed on the support 20*f*, the upper surface of the diaphragm 1 is substantially flush with the upper surfaces of the inner connectors 21*a* and 22*a* of the terminals 21 and 22.

The casing 20 also has a first sound-emitting hole 20*h* formed at a portion of the bottom wall 20*a* close to the side wall 20*c*.

The diaphragm 1 with the resin film 10 is housed in the casing 20, and the perimeter of the resin film 10 is placed on the support 20*f* of the casing 20. Then, the inner connectors 21*a* and 22*a* of the terminals 21 and 22 and portions of the resin film 10 opposed to the inner connectors 21*a* and 22*a* have elastic adhesives 13 applied therebetween so that the resin film 10 is fixed to the casing 20 by adhesion. The elastic adhesives 13 have a smaller Young's modulus in a cured state than electrically conductive adhesives 14, which will be described later. For example, urethane adhesives having a Young's modulus of about $3.7\times10^6$ Pa may preferably be used. Each elastic adhesive 13 is preferably applied so as to form a heaped shape like a mound.

After the resin film 10 is fixed to the casing 20, the two electrically conductive adhesives 14 are applied between the principal-surface electrode 2 exposed to the cut 8*a* and the inner connector 21*a* of the terminal 21 and between the auxiliary electrode 7 exposed to the cut 8*b* and the inner connector 22*a* of the terminal 22 so as to form a crank-like shape. For example, the one electrically conductive adhesive 14 extends outward through one of voids 12*a* where the corresponding undulated portion 12 of the resin film 10 is absent and detours around the outside of the undulated portion 12, wherein both ends thereof are respectively applied to the principal-surface electrode 2 and the inner connector 21*a*. In this state, since the electrically conductive adhesives 14 are not applied onto the undulated portions 12, the undulated portions 12 do not lose a stress-absorbing effect. Also, since each electrically conductive adhesive 14 is applied onto the corresponding elastic adhesive 13 having a heaped shape like a mound, a cure-shrinking stress or a restraining force of the electrically conductive adhesive 14 is prevented from being exerted on the resin film 10.

Likewise, the other electrically conductive adhesive 14 extends through the corresponding void 12*a* where the corresponding undulated portion 12 of the resin film 10 is absent, detours around the outside of the undulated portion 12, and overlies the elastic adhesives 13, wherein both ends thereof are respectively applied to the corresponding auxiliary electrode 7 and the inner connector 22*a*.

Preferably, the electrically conductive adhesives 14 are electrically conductive paste having a low Young's modulus after cured so as not to restrain deformation of the resin film 10. In this preferred embodiment, urethane electrically-conductive paste having a Young's modulus of about $0.3\times10^9$ Pa after being cured is preferably used. When the electrically conductive adhesives 14 are cured by heat after applied, the principal-surface electrode 2 and the inner connector 21*a* of the terminal 21 as well as the corresponding auxiliary electrode 7 and the inner connector 22*a* of the terminal 22 are electrically connected, respectively.

After the diaphragm 1 and the inner connectors 21*a* and 22*a* of the terminals 21 and 22 are mutually connected, an elastic sealant 15 is applied between the circumference of the resin film 10 and the inner periphery of the casing 20 so as to seal the space between the resin film 10 and the casing 20. Preferably, the elastic sealant 15 is an elastic adhesive having as small a Young's modulus as possible so as to permit the resin film 10 to be deformed. In this preferred embodiment, a silicone adhesive having a Young's modulus of about $3.0\times10^5$ Pa after being cured is preferably used.

After the diaphragm 1 with the resin film 10 is attached to the casing 20 as described above, the cover 30 is bonded to the upper opening of the casing 20 with an adhesive 31. Since the cover 30 is composed of a similar material to that of the casing 20, by bonding the cover 30 to the casing 20, the cover 30 and the diaphragm 1 have an acoustic space formed therebetween. The cover 30 has a second sound-emitting hole 32 formed therein.

The surface-mountable piezoelectric electroacoustic transducer is completed as described above.

In the electroacoustic transducer according to the present preferred embodiment, when a predetermined alternating voltage is applied between the terminals 21 and 22, the one piezoelectric ceramic layer whose polarization direction and electric field direction are the same as those of the diaphragm 1 contracts in directions along the surface thereof, and the other piezoelectric ceramic layer whose polarization direction and electric field direction are opposite to those of the diaphragm 1 expands in direction along the surface thereof, thereby allowing the entire diaphragm 1 to bend in the thickness direction thereof.

The piezoelectric diaphragm 1 is affixed onto the resin film 10 greater than itself, and the outer periphery of the resin film 10 onto which no diaphragm 1 is affixed is supported with the support 20*f* of the casing 20, whereby deformation of the diaphragm 1 is not strongly restrained. As a result, even when the diaphragm 1 has the same dimensions as those of a conventional one, its resonant frequency can be made lower, and also its deformation can be made greater because of a lowered support-constraining force exerted thereon, thereby achieving a high sound pressure.

Figure 4:
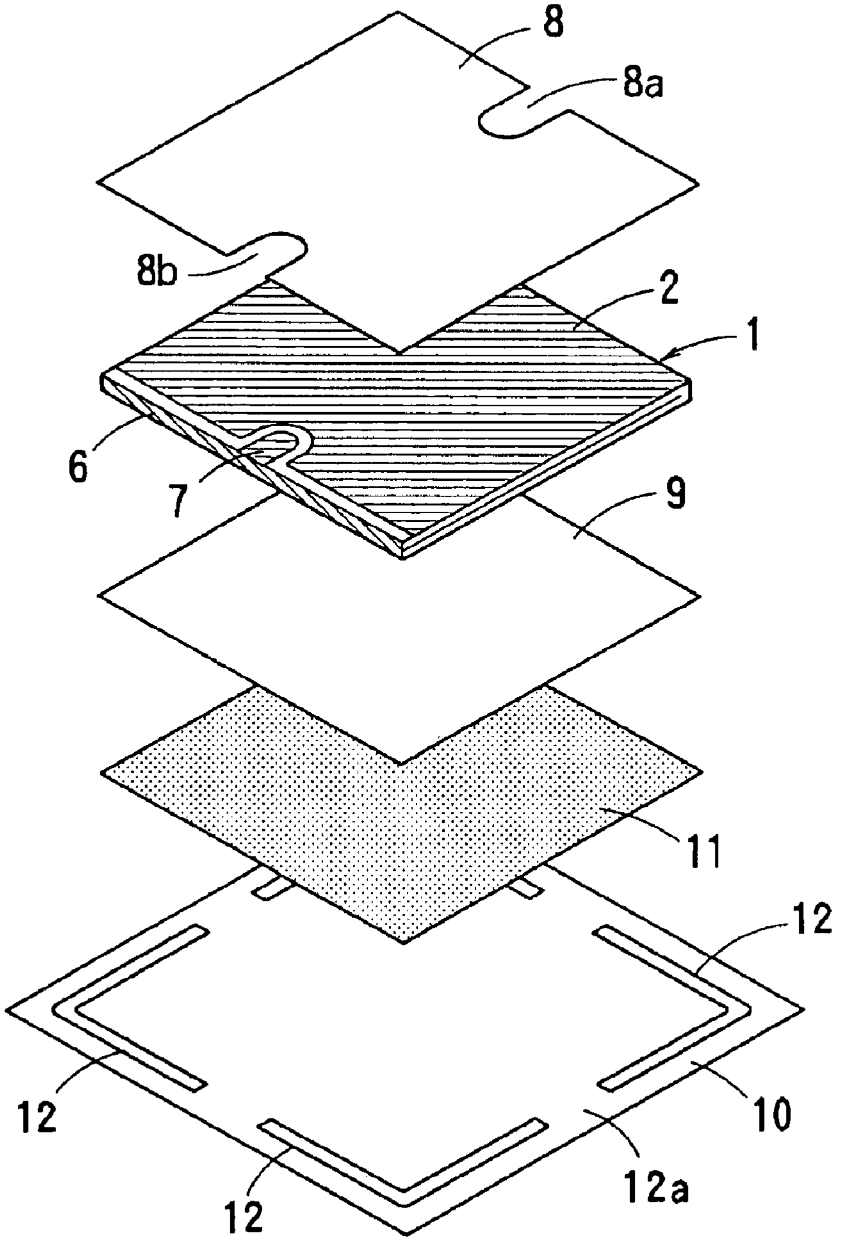
FIG. 4 is an exploded perspective view of a diaphragm with a resin film.
Figure 5A:
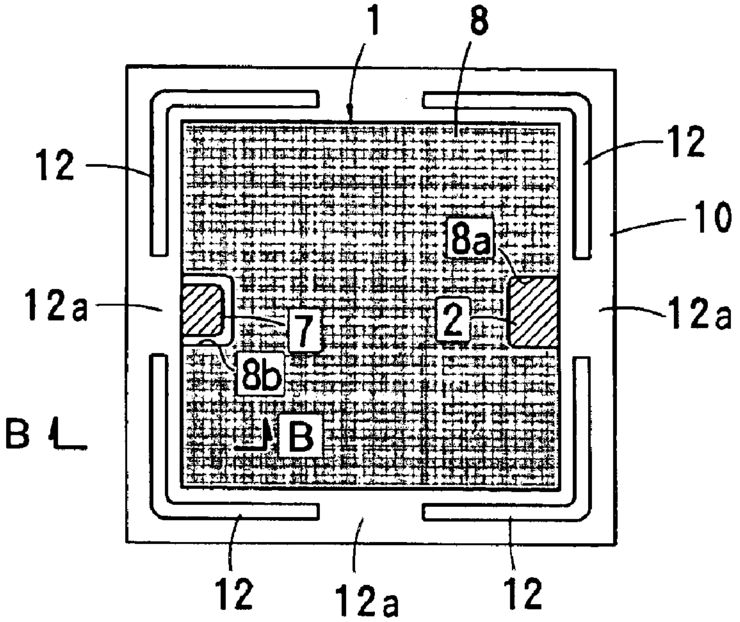
FIGS. 5(*a*) and (*b*) are respectively a plan view and a sectional view of the diaphragm with the resin film, taken along the line B—B indicated in FIG. 5(*a*)
Figure 5B:
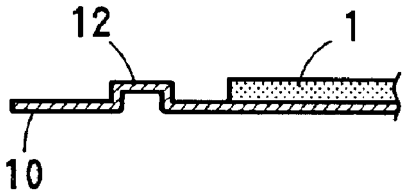
Figure 9A:
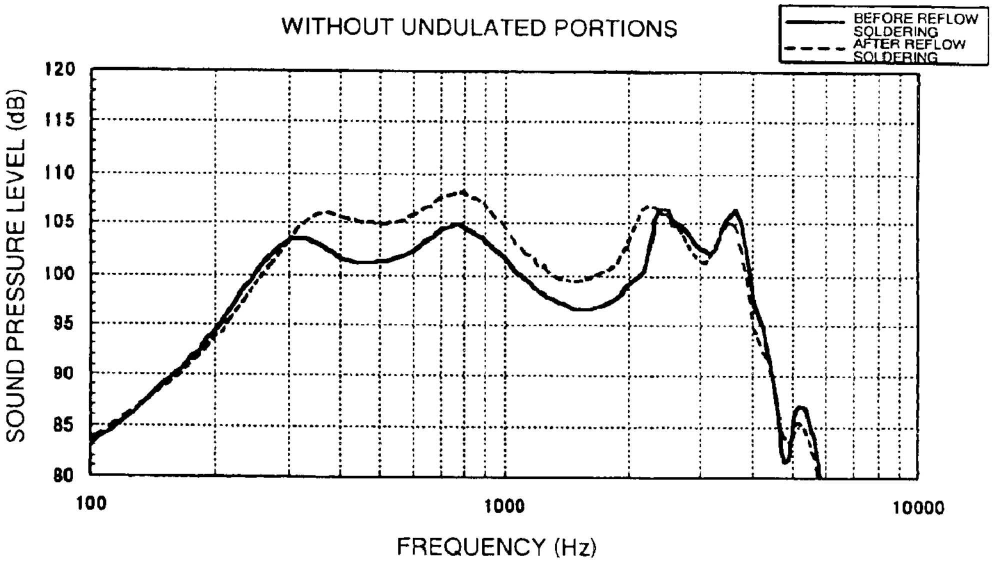
FIGS. 9(*a*) and (*b*) are comparative diagrams of sound pressure characteristics before and after reflow soldering between two electroacoustic transducers, the one provided with a piezoelectric diaphragm with a film having no undulated portions, the other provided with a piezoelectric diaphragm with a film having undulated portions.
Figure 9B:
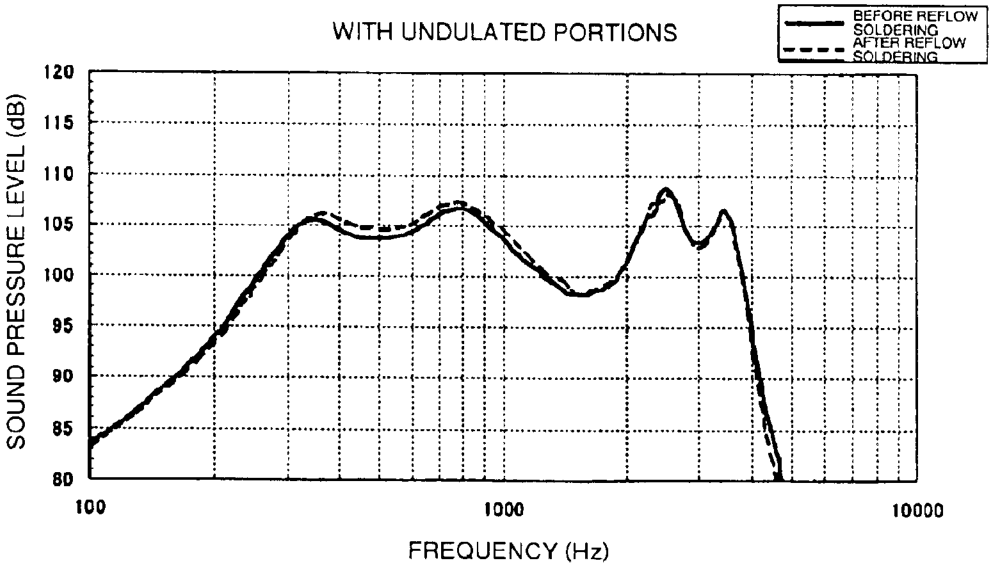

FIGS. 9(*a*) and (*b*) are comparative diagrams of sound pressure characteristics of two electroacoustic transducers before and after reflow soldering, wherein FIG. 9(*a*) illustrates the one electroacoustic transducer having a piezoelectric diaphragm with a resin film having no undulated portions, and FIG. 9(*b*) illustrates the other electroacoustic transducer having a piezoelectric diaphragm with a resin film having undulated portions as shown in FIGS. 4 and 5.

As is obvious from the figures, in the case where no undulated portions are provided, a sound pressure level at the fundamental resonant frequency (about 300 Hz) increases after reflow soldering, and the fundamental resonant frequency also varies toward the higher frequency side. Also, the secondary resonant frequency (about 2500 Hz) varies somewhat toward the lower frequency side.

On the contrary, in the case where the undulated portions are provided, both the fundamental resonant frequency and the secondary resonant frequency vary little and also an sound pressure level varies little between before and after reflow soldering, thereby achieving a very stable sound pressure characteristic.

Figure 10A:
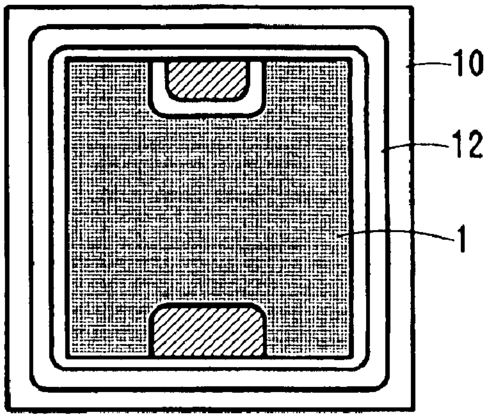
FIGS. 10(*a*) to (*c*) are plan views of other example diaphragms with a resin film according to preferred embodiments of the present invention.
Figure 10B:
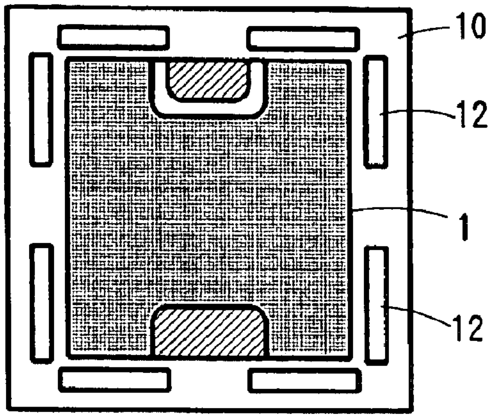
Figure 10C:
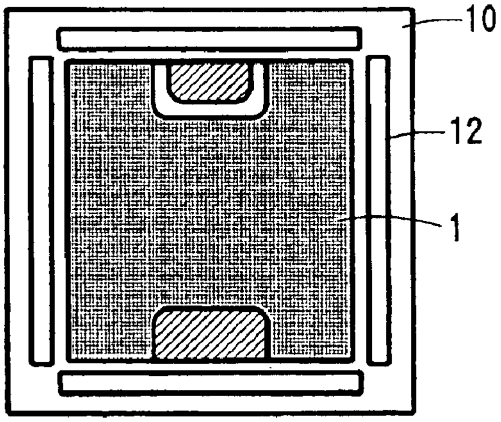

FIGS. 10(*a*) to (*c*) illustrate other example piezoelectric diaphragms with a resin film, wherein FIG. 10(*a*) illustrates a piezoelectric diaphragm having a structure in which the undulated portion 12 is disposed along the circumference of the resin film 10; FIG. 10(*b*) illustrates another piezoelectric diaphragm having a structure in which the undulated portions 12 are disposed along the four sides of the resin film 10 except for the central part of each side and the four corners of the resin film 10; and FIG. 10(*c*) illustrates another piezoelectric diaphragm having a structure in which the undulated portions 12 are disposed along the four sides of the resin film 10 except for the four corners of the resin film 10.

In any case, the same advantages as those achieved in the first preferred embodiment can be obtained in the present preferred embodiment of the present invention.

Figure 11:
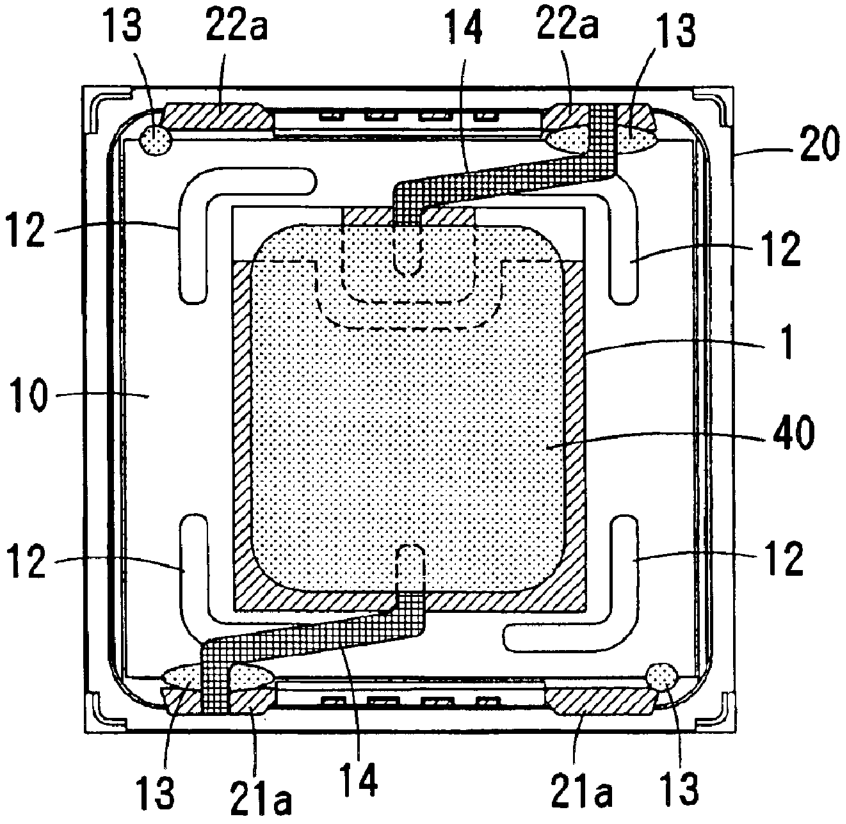
FIG. 11 is plan view of an electroacoustic transducer according to a second preferred embodiment of the present invention.

FIG. 11 illustrates an electroacoustic transducer according to a second preferred embodiment of the present invention.

In this preferred embodiment, a weighting member 40 preferably composed of a visco-elastic material is added only onto the piezoelectric diaphragm 1.

The weighting member 40 is desirably composed of a material, such as a silicone adhesive, having a Young's modulus of not greater than about 10 MPa in a cured state.

Figure 12:
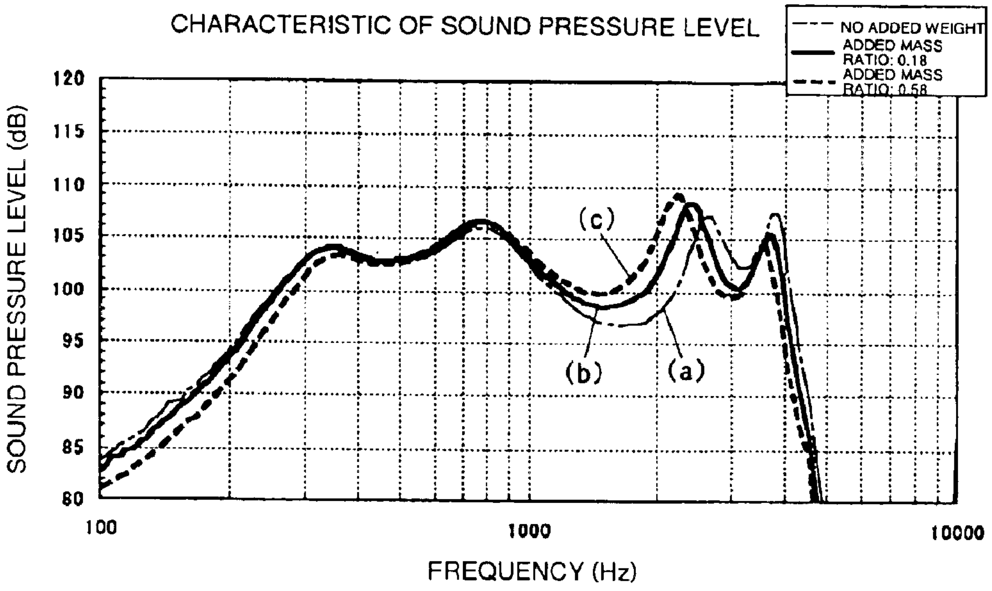
FIG. 12 is a comparative diagram illustrating the sound pressure characteristics of the piezoelectric diaphragm according to the first preferred embodiment and that according to a second preferred embodiment of the present invention.

FIG. 12 illustrates a comparative diagram of the sound pressure characteristics of the piezoelectric diaphragms with the resin film (measured with a low-leakage coupler according to the measuring condition stipulated in ITU-T3.2). In the diagram, (a) represents the sound pressure characteristic of the diaphragm according to the first preferred embodiment, showing that the obtained sound pressure has an almost flat characteristic in a frequency region from the fundamental resonant frequency to the secondary resonant frequency, thereby playing back a broadband voice. Since the characteristic unfortunately has a frequency region (about 1 kHz to about 2 kHz) that is lower than the secondary resonant frequency where the sound pressure drops, it is preferable to prevent such a drop in sound pressure as much as possible.

Thus, in the second preferred embodiment, the weighting member 40 composed of a visco-elastic material is added only onto the piezoelectric diaphragm 1 so as to make the secondary resonant frequency lower and a drop in sound pressure in the frequency range lower than the secondary resonant frequency smaller. In this case, the above-described arrangement is required not to affect on the fundamental resonant frequency and the sound pressure thereat.

In the diagram in FIG. 12, (b) and (c) represent the sound pressure characteristics of the diaphragms according to the second preferred embodiment with added mass ratios of about 0.18 and about 0.58, respectively. The added mass ratio is given by the following expression:

added mass ratio=mass of weight/masses of (resin film+adhesive+diaphragm+resin layers).

As is obvious from FIG. 12, as the added mass ratio becomes greater, the secondary resonant frequency becomes lower, and a drop in sound-pressure in a frequency region of about 1 kHz to about 2 kHz is decreased, thus the sound pressure characteristic in this frequency region is improved so as to become flatter. In the meantime, when the added mass ratio becomes excessively greater, the sound pressure in a frequency region lower than the fundamental resonant frequency decreases since an increase in the added weight is more likely to restrain deformation of the piezoelectric diaphragm 1.

Figure 13:
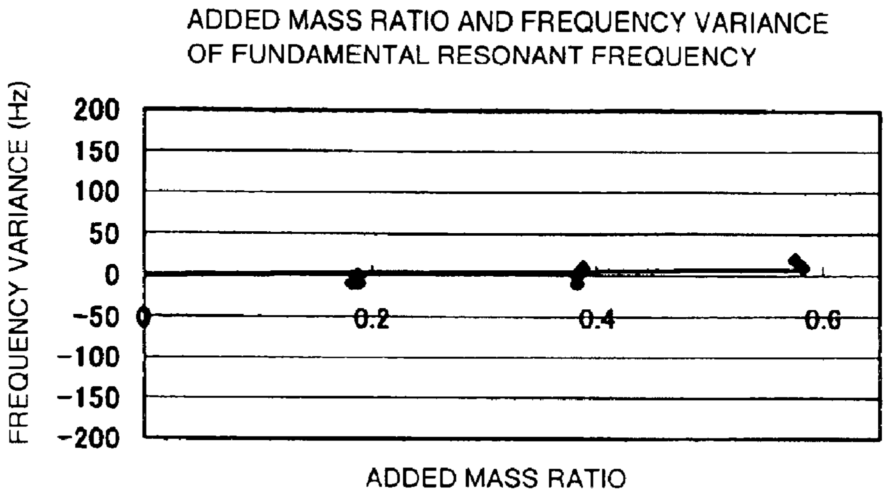
FIG. 13 is a diagram illustrating the relationship between added mass ratio and fundamental resonant frequency variance.
Figure 14:
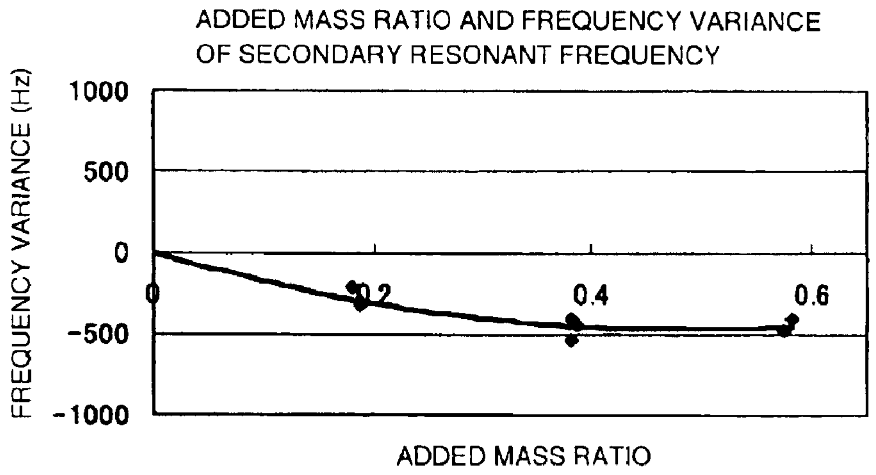
FIG. 14 is a diagram illustrating the relationship between added mass ratio and secondary resonant frequency variance.

FIGS. 13 and 14 illustrate the relationships between added mass ratio and variance in the fundamental resonant frequency and between added mass ratio and variance in the secondary resonant frequency, respectively.

When the added mass ratio increases, the fundamental resonant frequency increases slightly, while the secondary resonant frequency decreases.

Figure 15:
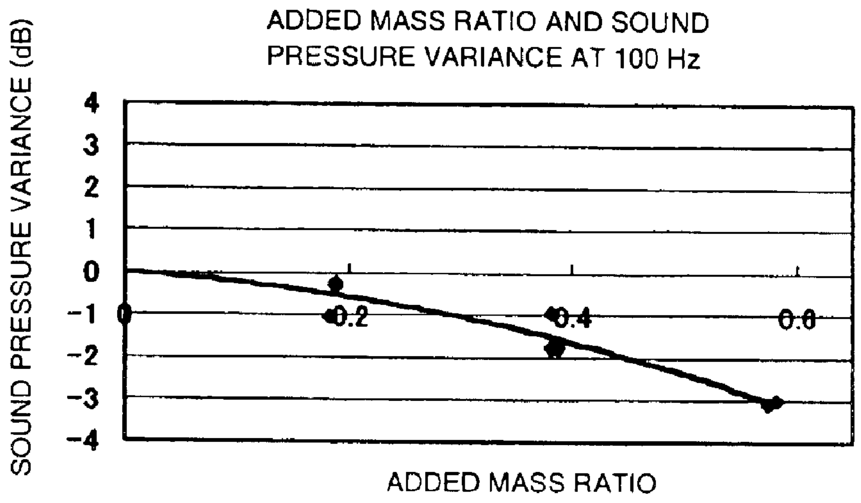
FIG. 15 is a graph illustrating the relationship between added mass ratio and sound pressure variance at about 100 Hz.
Figure 16:
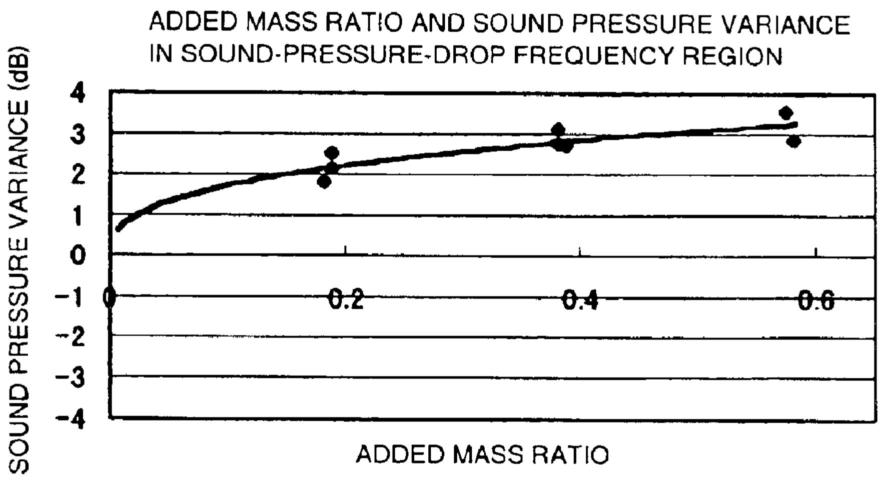
FIG. 16 is a graph illustrating the relationship between added mass ratio and sound pressure variance in a sound-pressure-drop frequency region.

FIG. 15 illustrates the relationship between added mass ratio and sound pressure variance at 100 Hz, and FIG. 16 illustrates the relationship between added mass ratio and sound pressure variance in the sound-pressure-drop frequency region.

As is known from these figures, as the added weight increases, the sound pressure at 100 Hz decreases, while the sound pressure in the sound-pressure-drop frequency region increases. As the added mass ratio becomes greater, the sound pressure is more likely to decrease, and also the secondary resonant frequency is not likely to become lower when the added mass ratio becomes greater than about 0.4 or so. With this result in mind, the preferable added mass ratio is not greater than about 0.4.

Figure 17:
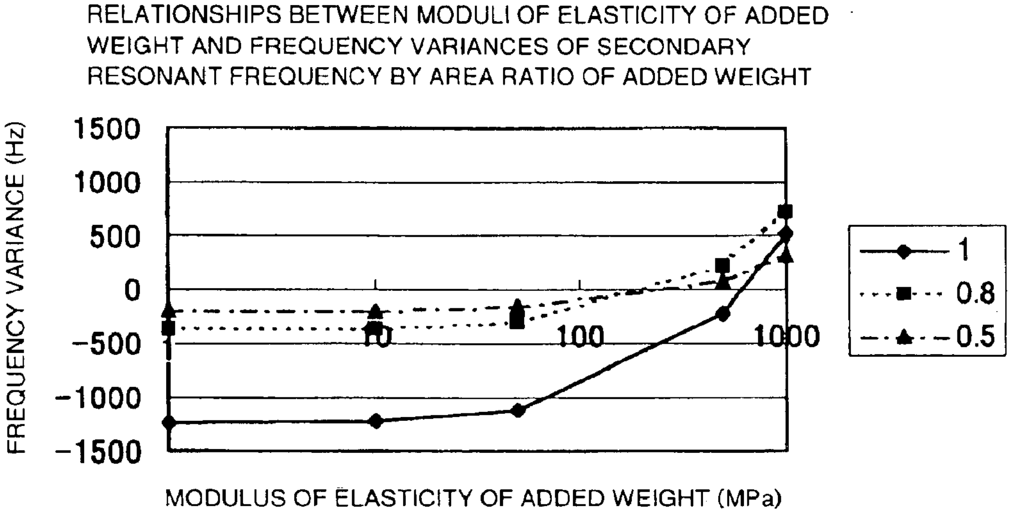
FIG. 17 is a graph illustrating the relationships between moduli of elasticity of added weights and frequency variances of the secondary resonant frequency by area ratio of the added weight.

Preferably the added weight, i.e. the weighting member, is preferably composed of a low elastic material in order to make the secondary resonant frequency lower. When the weighting member is composed of a high elastic material on the contrary, an apparent modulus of elasticity of the diaphragm increases, thereby causing an increase in the resonant frequency. FIG. 17 illustrates the relationships between moduli of elasticity (Young's moduli) of the added weights having the same mass and frequency variances of the secondary resonant frequency, taking the area ratio of each weighting member to that of the diaphragm as a variable parameter.

As is obvious from FIG. 17, when the modulus of elasticity exceeds about 10 MPa, the secondary resonant frequency tends to increase. Also, the greater the added area ratio, the secondary resonant frequency is effectively made lower.

The added weight can be easily applied by dispensing, for example.

The present invention is not limited to the above-described preferred embodiments, and it can be modified within the scope of its spirit.

Although each of the piezoelectric diaphragms 1 according to the above-described preferred embodiments is preferably formed by laminating two piezoelectric ceramic layers, it may be formed by laminating three or more piezoelectric ceramic layers. In this case, the interlayer(s) serves as a dummy layer which does not generate square-type vibrations.

Also, the present invention is not limited to the structure in which the piezoelectric diaphragm is affixed onto one surface of a resin film, and it may have a structure in which the two piezoelectric diaphragms 1 are affixed onto the front and rear surfaces of the resin film.

The housing of the present invention is not limited to having a structure formed by a depressed casing and a flat cover. For example, the housing may have a structure in which a depressed casing and a depressed cover face each other and are connected to each other, or alternatively another structure in which the piezoelectric diaphragm with a film is fixed inside a substantially rectangular frame having a support, and the frame has covers fixed onto the front and rear surfaces thereof. In addition, the housing may have another structure in which a support is disposed on a flat board, and the piezoelectric diaphragm with a resin film is fixed onto the support and is covered with a cover from above.

The resin film may be fixed to the housing by ultrasonic welding or heat welding instead using an adhesive.

The terminals of the present invention are not limited to those formed by molding so as to be insertable as in the above-described preferred embodiments, and the terminals may be thin or thick film electrodes, for example, extending outward from the upper surface of the support of the casing.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A piezoelectric electroacoustic transducer comprising:

an internal electrode;

a substantially rectangular piezoelectric diaphragm including an internal electrode, a plurality of laminated piezoelectric ceramic layers having the internal electrode interposed between two of the piezoelectric ceramic layers, principal-surface electrodes disposed on top and bottom principal surfaces of the piezoelectric diaphragm, wherein said piezoelectric diaphragm generates surface bending-vibrations in response to application of an alternating signal between the principal-surface electrodes and the internal electrode;

a substantially rectangular resin film that is larger than the piezoelectric diaphragm and having the piezoelectric diaphragm affixed onto substantially a central portion of a front surface thereof; and a housing having the piezoelectric diaphragm and the resin film housed therein and having a support for supporting an outer periphery of the resin film onto which the piezoelectric diaphragm is not affixed; wherein the resin film is heat resistant to at least a reflow-soldering temperature;

a perimeter of the resin film including four corners thereof is fixed to the support of the housing by adhesion;

an area of the piezoelectric diaphragm is about 40% to about 70% of an area of a portion of the resin film which is not fixed to the support by adhesion; and the resin film has at least one undulated portion bending in front and rear directions thereof and disposed in the outer periphery thereof onto which the piezoelectric diaphragm is not affixed and inside the perimeter thereof which is fixed to the support by adhesion.

2. The piezoelectric electroacoustic transducer according to claim 1, wherein said at least one undulated portion is disposed along the circumference of the resin film.

3. The piezoelectric electroacoustic transducer according to claim 1, wherein said at least one the undulated portion is disposed along each side of the resin film except for a central portion of the side, and electrically conductive adhesives applied on central portions of the sides of the resin film where the corresponding undulated portions are not located connect electrodes of the piezoelectric diaphragm with corresponding terminals disposed in the housing.

4. The piezoelectric electroacoustic transducer according to claim 1, wherein the piezoelectric diaphragm has a weighting member composed of a visco-elastic material added there onto.

5. The piezoelectric electroacoustic transducer according to claim 4, wherein the ratio of a mass of the weighting member to a total mass of the piezoelectric diaphragm including the resin film is not greater than about 0.4.

6. The piezoelectric electroacoustic transducer according to claim 4, wherein the Young's modulus of the weighting member is not greater than about 10 MPa.

7. The piezoelectric electroacoustic transducer according to claim 1, wherein the plurality of piezoelectric ceramic layers are polarized in a common direction of thickness thereof.

8. The piezoelectric electroacoustic transducer according to claim 1, wherein the principal-surface electrodes are shorter than a length of one side of the piezoelectric diaphragm.

9. The piezoelectric electroacoustic transducer according to claim 1, wherein the plurality of laminated piezoelectric ceramic layers have a substantially square shape.

10. The piezoelectric electroacoustic transducer according to claim 1, further comprising resin layers disposed on top and bottom surfaces of the piezoelectric diaphragm so as to cover the principal-surface electrodes.

11. The piezoelectric electroacoustic transducer according to claim 10, wherein the resin layers are made of a polyamide-imide resin having a thickness of about 5 $\mu$m to about 10 $\mu$m.

12. The piezoelectric electroacoustic transducer according to claim 1, wherein the resin film is thinner than the piezoelectric diaphragm and is composed of resin material with a Young's modulus in a range from about 500 MPa to about 15,000 MPa.

13. The piezoelectric electroacoustic transducer according to claim 1, wherein the resin film is heat resistant to at least about 300° C.

14. The piezoelectric electroacoustic transducer according to claim 1, wherein the resin film is composed of one of an epoxy, acrylic, polyimide, and polyamide-imide resin material.

15. The piezoelectric electroacoustic transducer according to claim 1, wherein the resin film is a substantially square polyimide film with a side of about 10 mm, a thickness of about 7.5 $\mu$m, and a Young's modulus of about 3400 MPa.

16. The piezoelectric electroacoustic transducer according to claim 1, wherein the area of the piezoelectric diaphragm is about 55% of the area of the portion of the resin film which is not fixed to the support by adhesion.

17. The piezoelectric electroacoustic transducer according to claim 1, further comprising a plurality of undulating portions that are disposed at least about 30% of the circumference of the housing.

18. The piezoelectric electroacoustic transducer according to claim 1, further comprising a plurality of undulating portions that are disposed along four sides of the resin film except for a central portion of each side and the four corners of the resin film.

19. The piezoelectric electroacoustic transducer according to claim 1, further comprising a plurality of undulating portions that are disposed along four sides of the resin film except for four corners of the resin film.

* * * * *